US008626387B1

(12) United States Patent
Nagata

(10) Patent No.: US 8,626,387 B1
(45) Date of Patent: Jan. 7, 2014

(54) DISPLAYING INFORMATION OF INTEREST BASED ON OCCUPANT MOVEMENT

(71) Applicant: Toyota Motor Engineering & Manufacturing North America, Inc., Erlanger, KY (US)

(72) Inventor: Katsumi Nagata, Dearborn, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 13/676,390

(22) Filed: Nov. 14, 2012

(51) Int. Cl.
*G06F 7/00* (2006.01)
*G06F 3/041* (2006.01)

(52) U.S. Cl.
USPC .................. 701/36; 701/45; 701/49; 345/173

(58) Field of Classification Search
USPC ..................... 701/2, 36, 45, 49; 345/156–184
See application file for complete search history.

(56) References Cited

U.S. PATENT DOCUMENTS

| 6,996,460 | B1* | 2/2006 | Krahnstoever et al. ........... 701/1 |
| 7,352,355 | B2 | 4/2008 | Troxell |
| 8,180,370 | B2 | 5/2012 | Kim |
| 2003/0105559 | A1* | 6/2003 | Avenel ............................. 701/2 |
| 2008/0215240 | A1 | 9/2008 | Howard |
| 2009/0225026 | A1 | 9/2009 | Sheba |
| 2010/0214112 | A1* | 8/2010 | Ishihara et al. ............. 340/686.1 |
| 2011/0141063 | A1* | 6/2011 | Grundmann et al. ......... 345/175 |
| 2011/0205162 | A1* | 8/2011 | Waller et al. .................. 345/173 |
| 2012/0105349 | A1* | 5/2012 | Hauschild et al. ............. 345/173 |
| 2012/0123649 | A1* | 5/2012 | Eggers et al. .................. 701/49 |
| 2012/0320080 | A1* | 12/2012 | Giese et al. .................... 345/619 |
| 2013/0009900 | A1* | 1/2013 | Pryor ............................ 345/173 |
| 2013/0079985 | A1* | 3/2013 | Wolf et al. ...................... 701/36 |

* cited by examiner

*Primary Examiner* — Mary Cheung
*Assistant Examiner* — Rodney Butler
(74) *Attorney, Agent, or Firm* — Dinsmore & Shohl LLP

(57) ABSTRACT

A method of displaying information of interest to an occupant of a vehicle is provided. The method includes detecting movement of a hand of the occupant toward a physical control using a sensor and the sensor sending a signal from the sensor to a processor in the vehicle when the hand is detected. The method determines information of interest based on the signal using the processor and then displays the information of interest on a display device.

16 Claims, 7 Drawing Sheets

DISPLAYING INFORMATION OF INTEREST BASED ON OCCUPANT MOVEMENT

FIELD

The disclosure relates to vehicle user interfaces that determine information of interest to display on a display device based on sensors that detect the physical movement of a vehicle occupant.

BACKGROUND

Vehicle display devices can be used to display information to vehicle occupants. Information may include navigation data, current temperature, or vehicle system settings. Since the information can usually be shown to occupants while a vehicle is in motion, vehicle manufacturers attempt to minimize the lag between an occupant's desire to see information on the display device, and the actual display of the information on the display device so as to minimize any distraction from operation of the vehicle.

SUMMARY

In one embodiment, a method of displaying information of interest to an occupant of a vehicle is provided. The method includes detecting movement of a hand of the occupant toward a physical control using a sensor and the sensor sending a signal from the sensor to a processor in the vehicle when the hand is detected. The method determines information of interest based on the signal using the processor and then displays the information of interest on a display device.

In another embodiment, a method of controlling a vehicle system is provided. The method includes detecting movement of a hand of an occupant toward a physical control using a sensor, where the physical control allows user control of a vehicle system. The sensor sends a signal from the sensor to a processor in the vehicle when the hand is detected and displays information of interest for the vehicle system. This allows the occupant to control the vehicle system using the display device.

In another embodiment, a vehicle user interface system includes a display device, a physical control, a processor, and a sensor. The sensor detects movement of a hand of an occupant toward the physical control and provides a signal to the processor upon detecting movement of the hand toward the physical control. The processor determines information of interest to display based on the signal and instructs the display device to display the information of interest.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are generally directed to vehicle user interfaces that may be included in vehicles. The vehicle user interfaces include display devices that may be used to display information of interest including vehicle system settings, applications, and the like. A sensor may be used to detect movement of a hand of an occupant toward a physical control and/or contact between the hand and the physical control and send a signal to a processor. The processor may then determine information of interest to be displayed on the display device based on the signal. Various embodiments of vehicle user interfaces are described in detail below.

Figure 1:
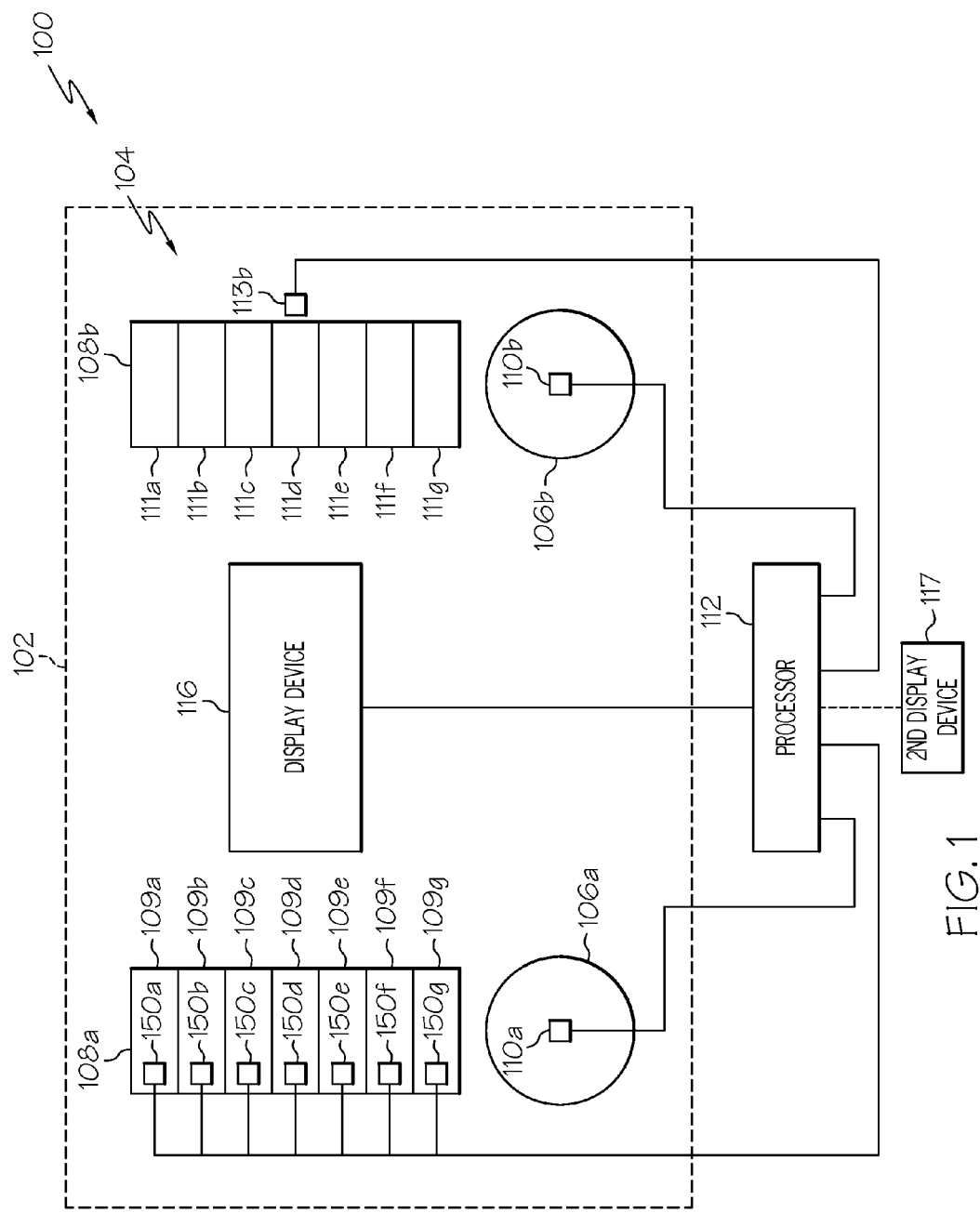
FIG. 1 is a schematic illustration of a vehicle user interface including physical controls, sensors communicating with a processor, and the processor communicating with a display device according to one or more embodiments described herein.

Referring to FIG. 1, a vehicle 100 includes a dash console 102. The dash console 102 includes a variety of physical control devices 104, and various configurations of sensors 110a, 110b, 113b, 150a-g that detect movement or proximity of a vehicle occupant's 120 hand 122 (shown in FIG. 2). The sensors 110a, 110b, 113b, 150a-g can be placed on or near the physical controls 104. When any of the sensors 110a, 110b, 113b, 150a-g detect movement, physical contact or proximity of the vehicle occupant's 120 hand 122 within a predetermined range, the respective sensor 110a, 110b, 113b, 150a-g is activated. Once the sensor 110a, 110b, 113b, 150a-g is activated, the sensor 110a, 110b, 113b, 150a-g sends an identification signal to a processor 112. Based upon the configuration of the sensor 110a, 110b, 113b, 150a-g, the identification signal that is sent by the sensor 110a, 110b, 113b, 150a-g can be either unique to that particular sensor 110a, 110b, 113b, 150a-g or shared by multiple sensors 110a, 110b, 113b, 150a-g. The identification signal associates the sensor 110a, 110b, 113b, 150a-g with information of interest 114 (shown in FIG. 2), which can include vehicle system control options. When the processor 112 receives the identification signal from the sensor 110a, 110b, 113b, 150a-g, the processor 112 determines the association between the identification signal and the information of interest 114. The processor 112 can instruct a display device 116 to display the information of interest 114 and/or vehicle system control options. This allows the information of interest 114 to be displayed on the display device 116 before or soon after the occupant 120 has made physical contact with the physical control 104. If there is more than one display device 116 in the vehicle 100, such as a second display device 117, the occupant 120 can select the display device 116, 117 the information of interest 114 should be displayed on, or the information of interest 114 can be displayed on more than one display device 116,117.

As shown in FIG. 1, multiple sensors 150a-g with shared identification signals can be used with multiple physical controls 104. For example, a column of buttons 108a can contain seven buttons 109a-g, along with seven sensors 150a-g. In this example, each of the sensors 150a-g may have a shared identification signal. Therefore, when any of the sensors 150a-g is activated, the sensor 150a-g sends the same identification signal to the processor 112. The processor 112 may determine information of interest 114 (shown in FIG. 2) accordingly. This exemplary embodiment may be used when several physical controls 104 pertain to the same vehicle system. An example of this shared signal configuration is illustrated in FIG. 3. Although the sensors 150a-g are illustrated on the buttons 109a-g, the sensors 150a-g may be located anywhere on or near the buttons 109a-g, depending, for example, on the range of the sensors 150a-g.

Figure 4:
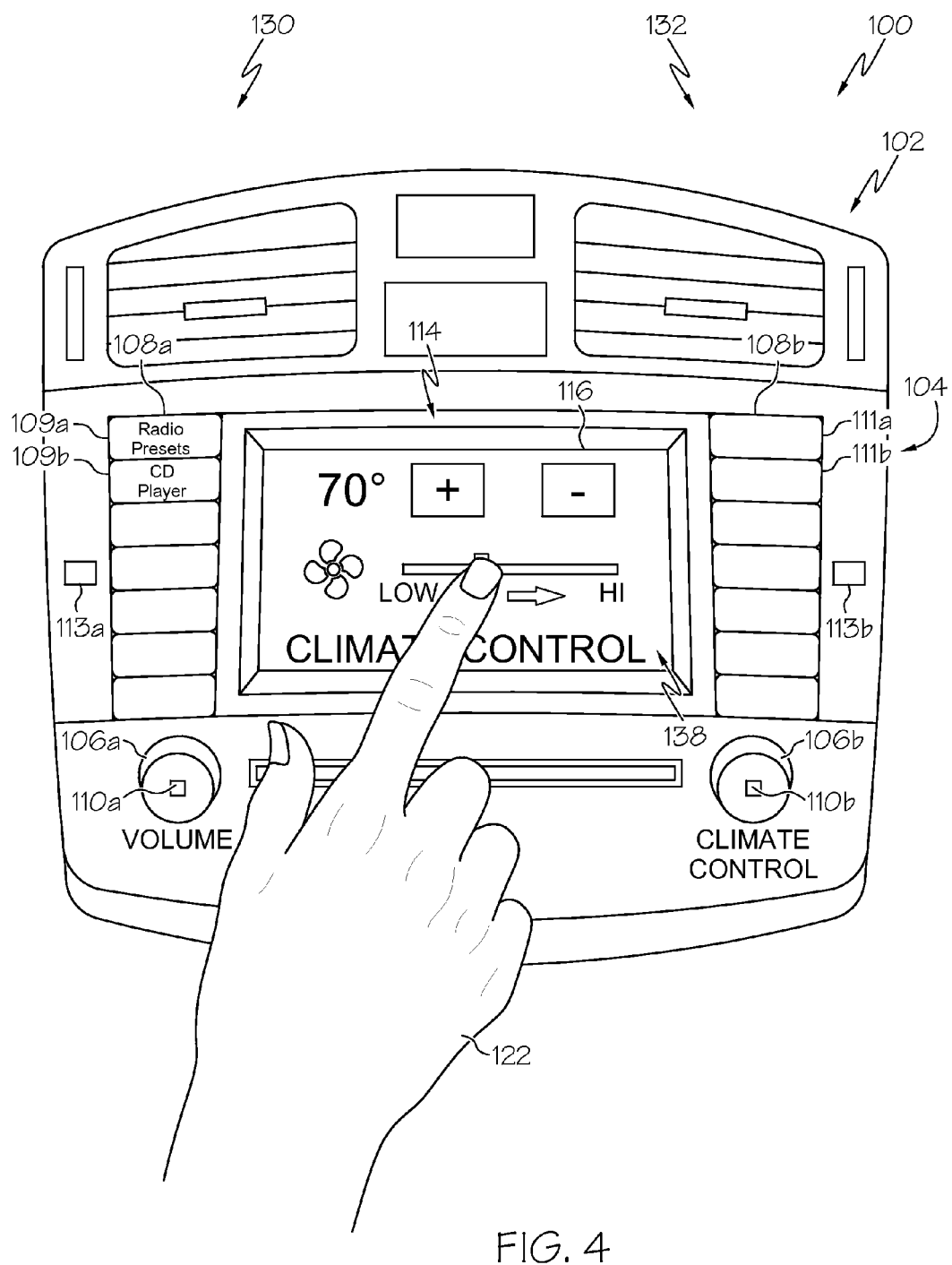
FIG. 4 is a close-up view of the dash console shown in FIG. 2 along with a hand of an occupant touching a display device.

Also shown in FIG. 1 is another configuration in which multiple physical controls 104 have a single sensor 113b. For example, a column of buttons 108b may have seven buttons 111a-g, yet only a single sensor 113b. In this instance, the sensor 113b will have a unique identification signal that it will send to the processor 112 when the sensor 113b is activated. The identification signal allows the processor 112 to determine that the sensor 113b is associated with the information of interest 114 (shown in FIG. 2) related to the column of seven buttons 108b, and instruct the display device 116 to display the information of interest 114 accordingly. Thus, when an occupant 120 (shown in FIG. 2) reaches towards any of the seven buttons 111a-g, the sensor 113b may be activated and the sensor 113b will send its unique identification signal to the processor 112. While the sensor 113b is illustrated near button 111d, the sensor 113b may be located on or near any of the buttons 111a-g, similar to sensors 150a-g. An example of this multiple physical controls per sensor configuration is illustrated in FIG. 4.

Another configuration shown in FIG. 1 is multiple physical controls 104 and multiple sensors 110a, 110b with unique identification signals. For example, the physical controls 104 may consist of two rotatable knobs 106a, 106b. Each rotatable knob 106a, 106b may have an individual sensor 110a, 110b. The first rotatable knob 106a may have a first sensor 110a, and the second rotatable knob 106b may have a second sensor 110b, and the first sensor 110a and second sensor 110b can each have a unique identification signal. When either of the sensors 110a, 110b are activated, the processor 112 can determine which sensor 110a, 110b was activated based on the unique identification signal received, and determine information of interest 114 (shown in FIG. 2) accordingly. This configuration can be used when a single sensor 110a has associated information of interest 114 that is different than information of interest 114 associated with a different sensor 110b. An example of this multiple physical controls and multiple sensors configuration is illustrated in FIG. 2.

Figure 2:
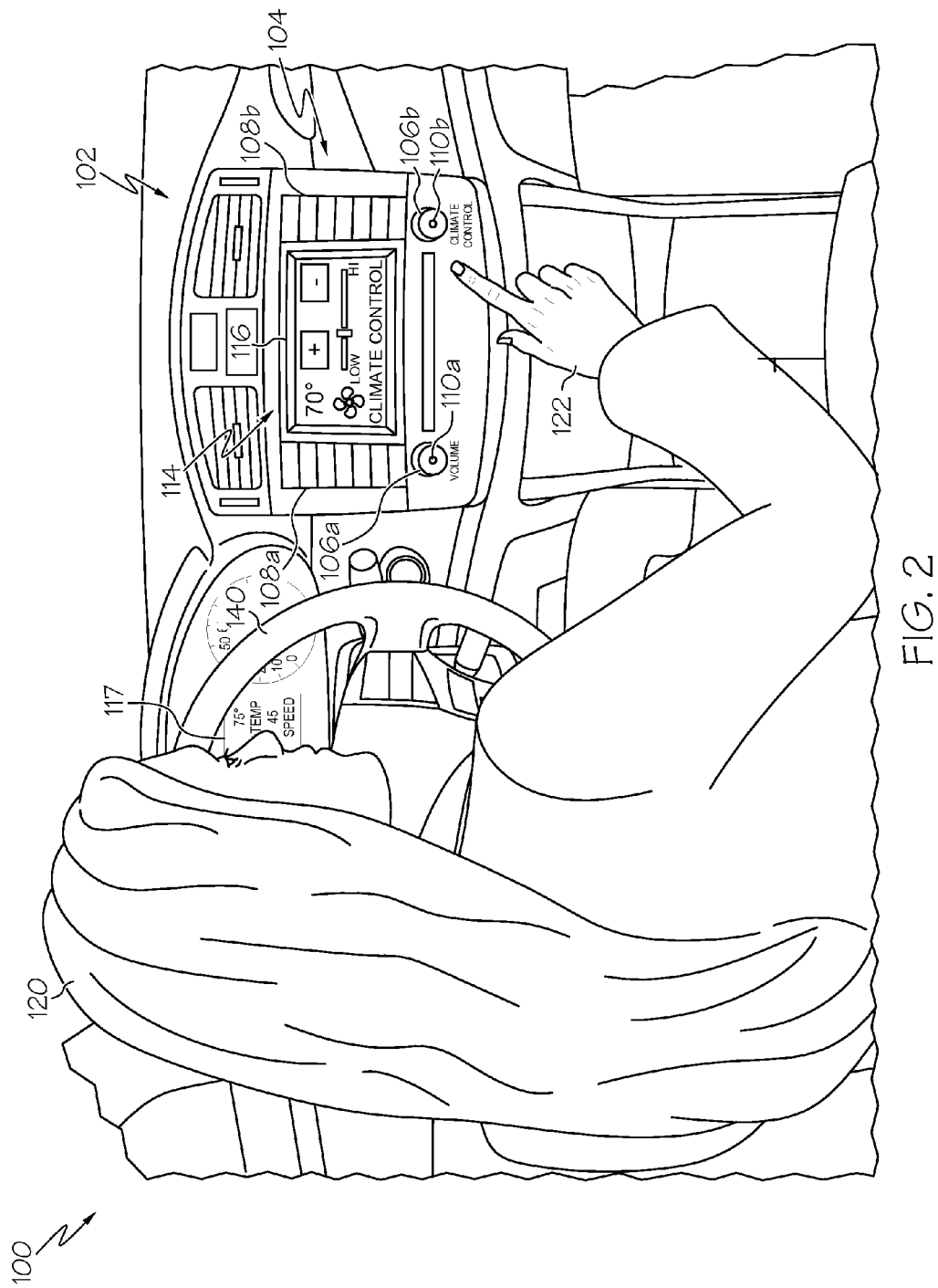
FIG. 2 illustrates a dash console of the vehicle including the vehicle user interface according to one or more embodiments described herein.
Figure 3:
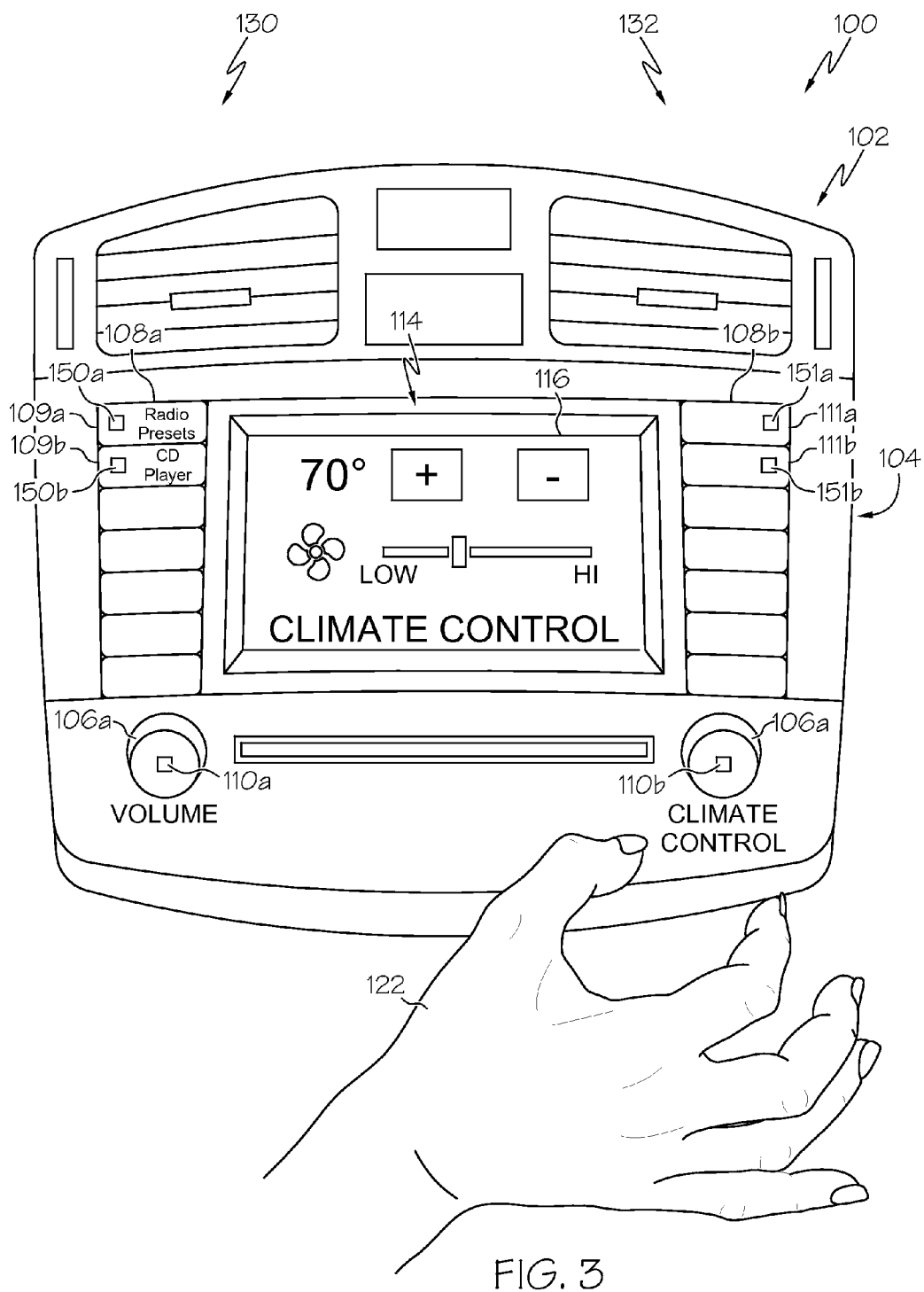
FIG. 3 illustrates a close-up view of the dash console shown in FIG. 2 along with a hand of an occupant reaching toward a physical control.

Referring to FIG. 2, the vehicle 100 and dash console 102 are shown. The dash console 102 includes a variety of physical controls 104, such as rotatable knobs 106a, 106b and pressable button columns 108a, 108b. Any other suitable physical control device may be used, such as include levers, switches, dials, etc. These physical controls 104 can be used to control a variety of vehicle systems or vehicle functions, such as air conditioning, radio station presets, and navigation controls. For example, the rotatable knobs 106a, 106b can be used to adjust climate control settings and radio volume, while the pressable button columns 108a, 108b may be used to select radio station presets and to control a navigation unit.

The dash console 102 may have multiple sensors 110a, 110b, as there can be one sensor 110a, 110b or multiple sensors for each physical control 104, as discussed above. The location of the sensors 110a, 110b can be on or near the physical controls 104. For example, the sensor 110a can be located at the center of or elsewhere on the rotatable knob 106a, as shown in FIG. 2, or can otherwise be located near the rotatable knob 106a, as long as the rotatable knob 106a is within the detection range of the sensor 110a. The detection range of the sensor 110a is determined by the type of sensor 110a used. For example, if the sensor 110a is a proximity sensor, the sensor 110a may have a detection range of about 0.1-1 inch, such as 0.5 inch, and may be placed within about 0.5 inch or less of a physical control 104. The sensor 110a may also be a motion detection sensor or capacitive sensor, and the detection range will vary accordingly.

The sensor 110a in FIG. 2 detects movement and/or contact by the hand 122 of the occupant 120 of the vehicle 100. The sensor 110a may be activated when the hand 122 comes within the detection range of the sensor 110a, which may include physical contact with the hand 122. When the sensor 110a is activated, the sensor 110a will send its unique identification signal to the processor 112 (shown in FIG. 1). The identification signal allows the processor 112 to determine which physical control 104 the occupant 120 is interested in, and the processor 112 is able to determine information of interest 114 or vehicle system control options accordingly, and instruct the display device 116 to display the information of interest 114. For example, the dash console 102 may have the physical control 104 that is the rotatable knob 106b labeled "Climate Control" located thereon. The sensor 110b positioned at or near the "Climate Control" rotatable knob 106b can have a unique identification signal that is sent to the processor 112 when the sensor 110b is activated. The processor 112 can determine information of interest 114 saved in its memory that is relevant to vehicle functions related to the "Climate Control" rotatable knob 106b and instruct the display device 116 to display the information of interest 114.

The display device 116 can be a touchscreen device, which allows the occupant 120 of the vehicle 100 to make changes to the vehicle systems or vehicle settings using the display device 116 rather than the physical control 104. By showing information of interest 114 on the display device 116, vehicle setting control options, vehicle functions, features, or information being sought by the occupant 120 can be adjusted or delivered through the display device 116 as well as the physical control 104. In FIG. 2, the hand 122 of the occupant 120 is shown reaching toward the rotatable knob 106b labeled "Climate Control." When the hand 122 activates the sensor 110b, the sensor 110b sends its unique signal to the processor 112 (shown in FIG. 1). The processor 112, knowing the unique signal of the sensor 110b is associated with the climate control vehicle system, instructs the display device 116 to display information of interest 114 relevant to the climate control vehicle system, such as options to adjust temperature and fan speed, along with a label of "Climate Control" appearing on the display device 116. The occupant 120 can now use inputs of the display device 116 to change the climate control settings (shown in FIG. 4). The processor 112 then receives input from the display device 116 when the occupant 120 uses the display device 116 to change a vehicle system setting. In some instances, the vehicle 100 may have more than one display device 116, such as the second display device 117 located in an instrument cluster or elsewhere. In this case, if the occupant 120 wants to use the particular display device 116, 117 for a certain purpose, the occupant 120 can select the certain display device 116, 117 using the specific physical control 104 on the dash console 102 or the steering wheel 140. The processor 112 may also display information of interest 114 on each of the display devices 116, 117.

In FIG. 3, the physical controls 104 are pressable buttons 109*a*, 109*b* that are located in pressable button column 108*a* nearer a driver's side 130 of the dash console 102 and pressable buttons 111*a*, 111*b* located in pressable button column 108*b* nearer a passenger's side 132 of the dash console 102. There is a sensor 150*a* and 150*b* for the pressable buttons 109*a* and 109*b* and a sensor 151*a* and 151*b* for the pressable buttons 111*a* and 111*b*. When multiple physical controls 104 with multiple sensors 150*a*, 150*b* are related to the same vehicle system or vehicle information, the processor 112 (shown in FIG. 1) can be provided with logic to determine the same information of interest 114 to display when any of the sensors 150*a*, 150*b* is activated. In the instance where each sensor 150*a*, 150*b* has a unique identification signal, the processor 112 can be provided with logic to place the unique identification signals into groups, wherein any identification signal received by the processor 112 from a certain group will result in the processor 112 determining the same information of interest 114. In the instance where each sensor 150*a*, 150*b* has a shared identification signal, the processor 112 will determine the same information of interest 114 regardless of which sensor 150*a*, 150*b* was activated.

For example, in FIG. 3, each sensor 150*a*, 150*b* may send a shared identification signal to the processor 112 (shown in FIG. 1) when any of the sensors 150*a*, 150*b* is activated. In other embodiments, each sensor 150*a*, 150*b* may send a unique identification signal to the processor 112, and if the sensors 150*a*, 150*b* are associated with the same vehicle system, such as radio controls in FIG. 3, the unique identification signals from the sensor 150*a*, 150*b* may be grouped by the processor 112 and the processor 112 may determine the same information of interest 114 for any identification signal received by the processor 112 in the group. In this example, when the sensor 150*a* located at or on the pressable button 109*a* labeled "Radio Presets" is activated, the processor 112 will determine the same information of interest 114 to display on the display device 116 as when the sensor 150*b* located at or on the pressable button 109*b* labeled "CD Player" is activated. This is because both sensors 150*a* and 150*b* may send unique identification signals to the processor 112, and the processor 112 can group the unique identification signals, as they control the same vehicle audio system.

Referring to FIG. 4, a multiple physical controls and single sensor embodiment is shown where the physical controls 104 are pressable button columns 108*a*, 108*b*. There is one sensor 113*a*, 113*b* per pressable button column 108*a*, 108*b*, or multiple physical controls 104. When the sensor 113*a* is activated by detecting the hand 122 of the occupant 120 (shown in FIG. 2) within the detection range of the sensor 113*a*, the sensor 113*a* sends a unique identification signal to the processor 112 (shown in FIG. 1). Using this signal, the processor 112 determines information of interest 114 to show on a display device 116. The same information of interest 114 will be shown for each of the buttons 109*a* and 109*b* because the same sensor 113*a* will be activated for each of the buttons 109*a* and 109*b*. If another sensor 113*b* is activated, the processor 112 determines different information of interest 114 to display, as the sensor 113*b* can have a unique identification signal and can therefore be associated with different vehicle systems. The occupant 120 can then manipulate a vehicle 100 system using the display device 116.

Figure 5:
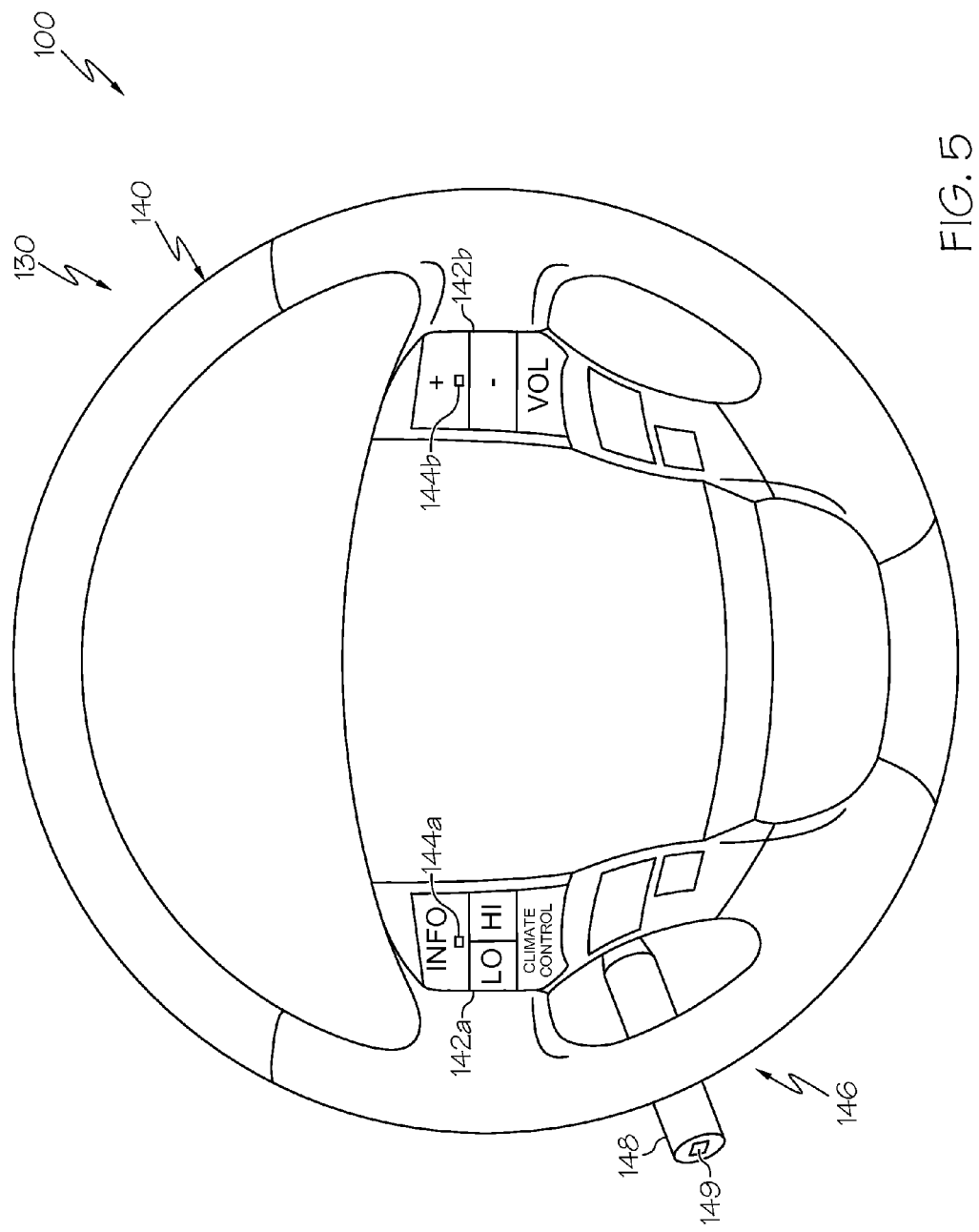
FIG. 5 includes a steering wheel of a vehicle for use in the vehicle user interface according to one or more embodiments described herein.

Referring to FIG. 5, while physical controls 104 on the dash console 102 are described above, sensors may be used at other locations. For example, a steering wheel 140 of vehicle 100 is shown. The steering wheel 140 includes at least one steering wheel button 142*a*, 142*b* and a corresponding steering wheel sensor 144*a*, 144*b* located at or near the steering wheel button 142*a*, 142*b*. For example, the steering wheel 140 may have climate control buttons 142*a* or volume buttons 142*b* on the steering wheel 140. Any sensor 144*a*, 144*b* located on the steering wheel 140 can be used in a manner similar to the sensors 110*a*, 110*b* located on the dash console 102 (shown in FIG. 2) of the vehicle 100. Behind the steering wheel 140 is a steering column 146 that extends into the vehicle 100. The steering column 146 may include a steering wheel column stick 148. The steering wheel column stick 148 may include buttons or may be manipulated along intersecting axes to activate functions such as cruise control or windshield wipers. The steering wheel column stick 148 can include a sensor 149, which provides a unique identification signal to the processor 112 (shown in FIG. 1) when it is activated by the hand 122 of an occupant 120 (shown in FIG. 2). The steering wheel 140 may also include controls or buttons 142*a*, 142*b* that allow the occupant 120 to select a particular display device 116, 117 (shown in FIG. 2) to display certain information of interest 114 (shown in FIG. 2), or to toggle information of interest 114 between display devices 116, 117.

Figure 6:
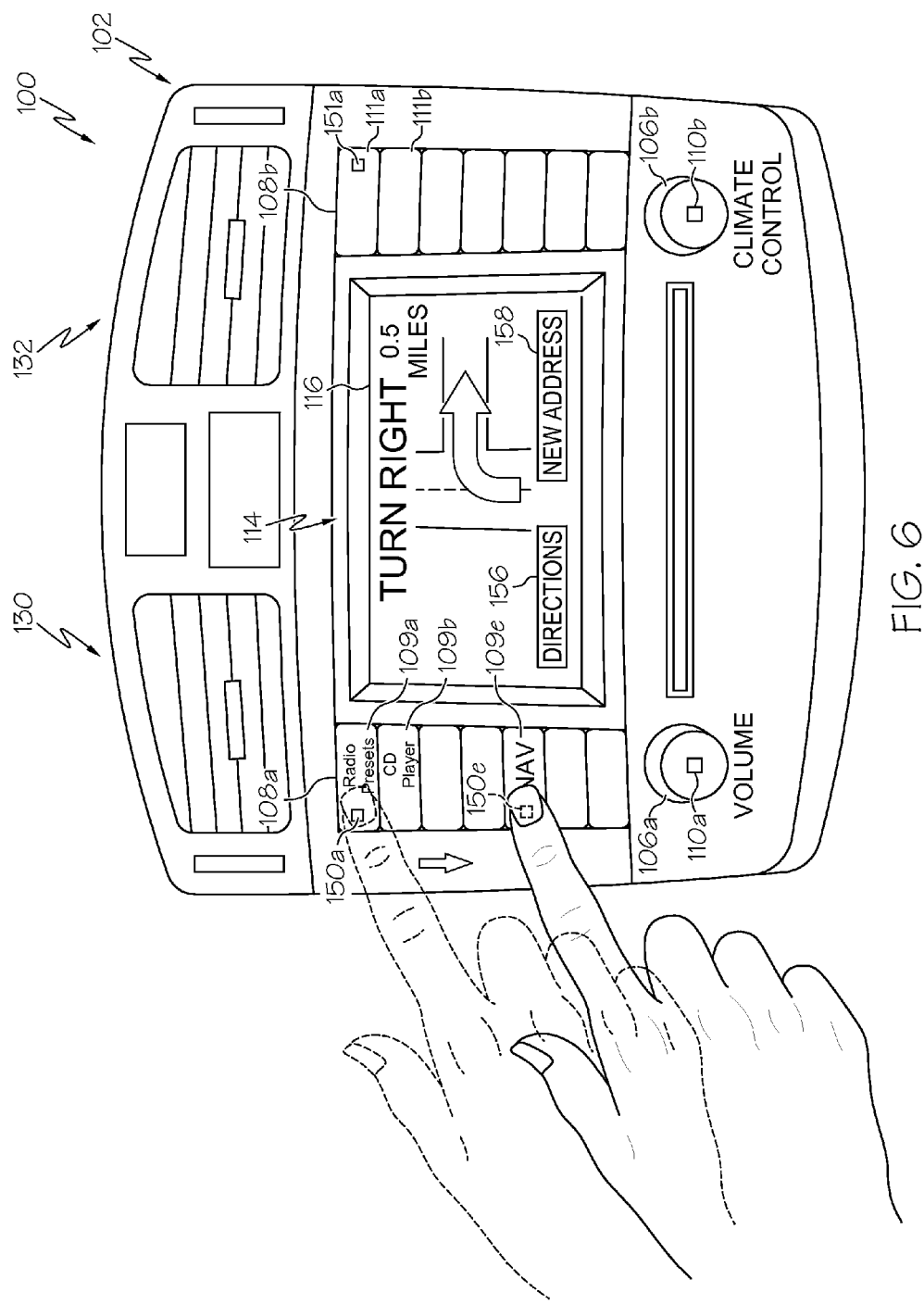
FIG. 6 includes a close-up of the dash console shown in FIG. 2 along with a hand of an occupant touching the dash console.

Referring to FIG. 6, the dash console 102 of vehicle 100 is shown. Pressable button columns 108*a*, 108*b* may be located on either side of the display device 116. The pressable button columns 108*a*, 108*b* may have a sensor 150*a*, 150*e* located on each pressable button 109*a*, 109*e*. In this case, the occupant's hand 122 may activate more than one sensor 150*a*, 150*e* within a short time. For example, as shown in FIG. 6, the hand 122 may first activate the sensor 150*a* located at a first button 109*a* labeled "Radio Presets", and then activate the sensor 150*e* located at a second button 109*e* labeled "NAV" shortly after. The processor 112 (shown in FIG. 1) can include priority logic to filter multiple sensor 150*a*, 150*e* activations by instructing the display device 116 to display information of interest 114 for the sensor 150*e* that was activated last. In this embodiment, the priority logic is based on timing. As shown, the display device 116 is displaying information of interest 114 that is relevant to the "NAV" pressable button 150*e*. The occupant 120 can now make selections such as select "Directions" 156 or enter a "New Address" 158 as shown on the display device 116. As another example, the priority logic may be based on position of the physical controls 104. In the case where a sensor 150*a* nearer the driver's side 130 and a sensor 151*a* nearer the passenger's side 132 of the dash console 102 are both activated at the same time or within a predetermined time, the processor 112 (shown in FIG. 1) can be configured to give priority to the sensor 150*a* located on the driver's side 130 of the dash console 102. In other embodiments, the processor 112 can be configured to give priority to the sensor 151*a* located on the passenger's side 132, or to give priority to the sensor 150*a*, 151*a* pressed first.

Figure 7:
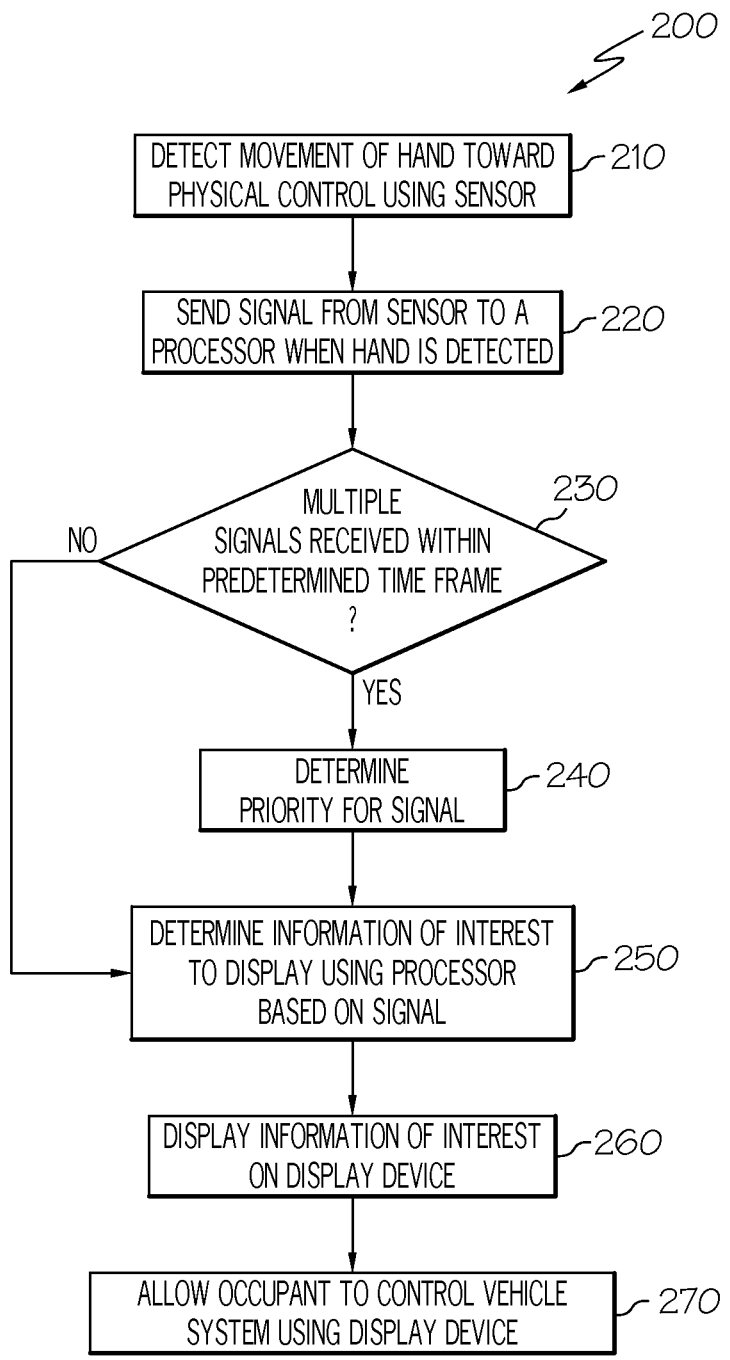
FIG. 7 illustrates a method of displaying information of interest to an occupant of a vehicle and controlling a vehicle system according to one or more embodiments described herein.

Referring to FIG. 7, a method 200 of displaying information to an occupant of a vehicle is illustrated by first detecting movement using a sensor at step 210. At step 220, the sensor sends a signal to the processor when the sensor is activated. At step 230, the processor checks whether multiple signals have been received within a predetermined time frame, such as about one second or less, such as about 0.5 second or less, or about 0.2 second or less. If multiple signals have been received, the processor determines a priority for the signals at step 240. After the processor determines priorities, or if multiple signals have not been received, the processor determines information of interest to display based on the signal from the sensor at step 250. At step 260 the information of interest is displayed on a display device, and at step 270 the occupant is allowed to control the vehicle system using the display device.

The above-described information of interest 114 based on occupant 120 movement and methods for controlling vehicle 100 systems allows the occupant 120 of a vehicle 100 to be delivered information of interest 114 on the display device 116 in the vehicle 100 that is relevant to what the occupant 120 is looking for in a timely manner and allows the occupant 120 to make several choices or modify several settings at once. By using the sensor 110a to determine when the occupant's hand 122 is near, the time required for the information of interest 114 to be displayed on the display device 116 is minimized, and the occupant 120 spends less time distracted from the operation of the vehicle 100.

It should now be understood that embodiments described herein are directed toward vehicle user interfaces that determine information of interest to display on a display device based on sensors that detect the physical movement of an occupant. At least one sensor located at or near a physical control is activated by an occupant's hand and sends a signal to a processor. The processor determines information of interest to display on a display device based on the signal, and the display device displays the information of interest.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of displaying information to an occupant of a vehicle, the method comprising:
   detecting the presence of a hand of the occupant within a preselected distance of a first physical control device using a first sensor at or near the first physical control device, where the first physical control device is used to modify operation of a first vehicle system;
   detecting the presence of the hand of the occupant within a preselected distance of a second physical control device using a second sensor at or near the second physical control device, where the second physical control device is used to modify operation of a second vehicle system;
   sending a signal from the first sensor or second sensor to a processor in the vehicle when presence of the hand is detected within the preselected distance of the first physical control device or the preselected distance of the second physical control device;
   based on the signal, determining information of interest associated with the first vehicle system or the second vehicle system to display on a display device;
   displaying the information of interest on the display device; and
   modifying the information of interest being displayed on the display device based on occupant manipulation of the first physical control device or the second physical control device.

2. The method of claim 1, wherein the first sensor is a proximity sensor.

3. The method of claim 1 further comprising modifying operation of the first vehicle system associated with the first physical control device or the second vehicle system associated with the second physical control device using inputs of the display device.

4. The method of claim 3, wherein the display device is a touchscreen display, the touchscreen display comprising inputs configured to modify operation of the first vehicle system or the second vehicle system.

5. The method of claim 1, wherein the first physical control device is located on a steering wheel or steering wheel column, or dash console.

6. The method of claim 1, wherein the first sensor is a capacitive sensor.

7. The method of claim 1 further comprising determining information of interest associated with the first vehicle system or the second vehicle system to display on the display device based on the signal sent by the sensor activated last when both the first sensor and the second sensor are activated within a predetermined time period.

8. The method of claim 7, wherein the predetermined time period is less than or equal to one second.

9. The method of claim 1, wherein the preselected distance of the first physical control device is within about 0.5 inch.

10. A vehicle user interface system comprising:
    a display device;
    a first physical control device operable to modify operation of a first vehicle system;
    a second physical control device operable to modify operation of a second vehicle system;
    a processor electrically coupled to the display device and the first and second physical control devices;
    a first sensor at or near the first physical control device that detects the presence of a hand of an occupant within a preselected distance of the first physical control device and provides a signal to the processor upon detecting presence of the hand within the preselected distance of the first physical control device; and
    a second sensor at or near the second physical control device that detects the presence of a hand of an occupant within a preselected distance of the second physical control device and provides a signal to the processor upon detecting presence of the hand within the preselected distance of the second physical control device;
    wherein the processor:
        determines information of interest associated with the vehicle system to display on the display device based on the signal provided by the first sensor or the second sensor;
        instructs the display device to display the information of interest; and
        modifies the information of interest displayed on the display device based on occupant manipulation of the first physical control device or the second physical control device.

11. The system of claim 10, wherein the first sensor is a proximity sensor.

12. The system of claim 10, wherein the display device is a touchscreen display, the touchscreen display comprising inputs configured to modify the information of interest displayed on the touchscreen display.

13. The system of claim 12, wherein the inputs of the touchscreen display are configured to modify operation of the vehicle system.

14. The system of claim 10, wherein the first physical control is located on a steering wheel or steering wheel column, or dash console.

15. The system of claim 10, wherein the preselected distance of the first physical control device is within about 0.5 inch.

16. The system of claim 10, wherein the first sensor is a capacitive sensor.

* * * * *